United States Patent [19]
Lee et al.

[11] Patent Number: 5,867,088
[45] Date of Patent: Feb. 2, 1999

[54] MAXIMUM VALUE/MINIMUM VALUE EXTRACTOR AND METHOD

[75] Inventors: Yong-Hoon Lee; Dong-Jin Shin, both of Seoul, Rep. of Korea

[73] Assignee: LG Semicon Co., Ltd., Cheongju, Rep. of Korea

[21] Appl. No.: 883,170

[22] Filed: Jun. 26, 1997

[30] Foreign Application Priority Data

Oct. 7, 1996 [KR] Rep. of Korea ................... 1996 44233

[51] Int. Cl.⁶ ....................................................... G06F 7/02
[52] U.S. Cl. ......................................................... 340/146.2
[58] Field of Search .......................................... 340/146.2

[56] References Cited

U.S. PATENT DOCUMENTS 5,721,809  2/1998  Park ...................................... 340/146.2

OTHER PUBLICATIONS

Computer Arithmetic Principles, Architecture, and Design, Kai Hwang, 2.4 "Complementers and Magnitude Comparators," pp. 43–46.

*Primary Examiner*—Margaret Rose Wambach

[57] ABSTRACT

A minimum value/maximum value extractor and method including: a multiplexer for outputting data and inverted data receiving from data lines depending on a maximum/minimum value selecting signal; a plurality of maximum value extracting parts for receiving the output of the multiplexer, a clock signal and a reset signal, the extracting parts outputting a first output which becomes the same signal state as that of the initially input data bits and maintains "0" regardless of subsequent data bits value once the input data bit becomes "0" until the reset signal is applied, and a second output which follows the first output value by delayed by two clock cycles; a maximum value/minimum value signal generator for outputting a value which is a NORed value of all inputs from the extracting parts as a minimum value or a value which is an inverted value of the NORed value of all inputs from the extracting parts as a maximum value; and a plurality of reset signal generators for generating the reset signal for resetting the first output of the extracting parts as an initial value if the two input signals are at the same state, wherein a data string in which the second output of each maximum value extracting part is "1" is the data string having the maximum/minimum values among a plurality of data bit strings and a value output through the maximum/minimum value signal generator becomes the maximum/minimum value.

24 Claims, 7 Drawing Sheets

MAXIMUM VALUE/MINIMUM VALUE EXTRACTOR AND METHOD

BACKGROUND OF THE INVENTION

1. Field of the Invention

The present invention relates to a maximum value/minimum value extractor and method and, more particularly, to a circuit which receives a large amount of data serially, extracts a maximum value and/or minimum value from the large amount of data, and additionally identifies the address of the maximum value and/or minimum value.

2. Discussion of Related Art

A conventional maximum or minimum value extractor operates to obtain a maximum and/or minimum value by, first, comparing two data inputs using a comparator, and then extracting the larger (or smaller) value of the two data inputs. However, too many compare operations are needed for this conventional extractor. An example of the maximum/minimum value extracting operation among four data inputs A, B, C, D is illustrated in FIG. 1. First and second comparators are employed to compare two data inputs. A third comparator is employed to compare the outputs of the first and second comparators. These comparators obtain a maximum value by operating as follows. The larger of data inputs A and B compared by the first comparator is labelled MAX(A, B). The larger of data inputs C and D compared by the second comparator is labelled MAX(C, D). The larger of MAX(A, B) and MAX(C, D) compared by the third comparator is labelled MAX(A, B, C, D). The comparators also obtain the minimum value in a similar manner. The smaller of the two data inputs A and B, compared by the first comparator is named MIN(A, B). The smaller of the two data inputs C and D, compared by the second comparator is labelled MIN(C, D). The smaller of MIN(A, B) and MIN(C, D), compared by the third comparator, is labelled MIN(A, B, C, D).

FIG. 2 illustrates a conventional comparator structure, by Kai Hwang, "Computer Arithmetic: Principle, Architecture & Design".

In this circuit, two 4-bit data inputs A=A0A1A2A3 and B=B0B1B2B3 are compared to determine which is larger using the results of A>B, B>A, or A=B. That is, if A>B is, the value of the A>B output is "0" and another bit value becomes "0". If A<B, the value of the A<B output is "1", and another bit values are "0". In addition, if A=B, the output of the A=B is "1" and other bit value is "0".

In case of obtaining the maximum value using this conventional comparator, after the data is input, a considerably long time is required to compute the result. Moreover, because many comparators are employed to obtain the maximum and/or minimum values, the size of the chip is increased, and much time is needed to perform the many comparison operations.

SUMMARY OF THE INVENTION

Accordingly, the present invention is directed to a maximum value/minimum value extractor and method that substantially obviates one or more of the problems due to limitations and disadvantages of the related art.

An object of the present invention is to provide a high-speed maximum value/minimum value extractor or a maximum value/minimum value address extractor and method which receives n number of M bit data values serially and determines the maximum value and/or minimum value in a clock cycle whose number is the same as that of the bit data, and their addresses.

To achieve these and other advantages and in accordance with the purpose of the present invention, as embodied and broadly described, a minimum value/maximum value extractor of the present invention includes:

a multiplexer of which one input port is connected to a data line and another input port is connected to the data line through an inverter, the multiplexer outputting the data and inverted data of the data line by a maximum/minimum value selecting signal;

a plurality of maximum value extracting parts for receiving the output of the multiplexer, a clock signal and a reset signal, the maximum value extracting parts outputting a first output which becomes the same signal state as that of the initially input data bits, and maintains "0" regardless of the next data bit value once the input data bit becomes "0" until any reset signal is applied, and a second output which follows the first output value by being delayed for two clock cycles;

a maximum value/minimum value signal generator having inputs respectively connected to the first outputs of the plurality of maximum value extracting parts by the maximum/minimum value selecting signal, and outputting the value which is a NORed value with respect to all inputs as for the minimum value or the value which is inverted value of the NORed value as the maximum value; and a plurality of reset signal generators having one input terminal to which the second outputs of the plurality maximum value extracting parts are respectively connected, and the other input terminal to which the minimum signal of the maximum/minimum value signal generator is connected, and thereby generating a reset signal for resetting the first output of the maximum extracting part to an initial value if the two input signals are at the same state, wherein the data string in which the second output of the plurality of maximum value extracting parts is "1" is the data string having the maximum/minimum values among the plurality of data bit strings and the value output through the maximum/minimum value signal generator becomes the maximum value or the minimum value.

To achieve these and other advantages and in accordance with the purpose of the present invention, as embodied and broadly described, a method of extracting a maximum value from a plurality of data bit strings includes (a) outputting a first output having a value equal to that of a first bit input thereto and maintaining a "0" signal state regardless of subsequent data bit values once the input data bit becomes "0" until a reset signal is applied, and outputting a second output which follows the first output value, delayed by two clock cycles of a clock signal; (b) receiving the first output of said step (a) and outputting an ORed value of all inputs and outputting a result as a maximum value signal; and (c) receiving second outputs from said step (a) and a minimum signal from said step (b) thereby resetting the first output of said step (a) to an initial value, if the two input signals are at the same state, wherein a data string in which the second output of said step (a) is "1" is a data string having the maximum value among the plurality of data bit strings and a value output by said step (b) becomes the maximum value signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Figure 1:
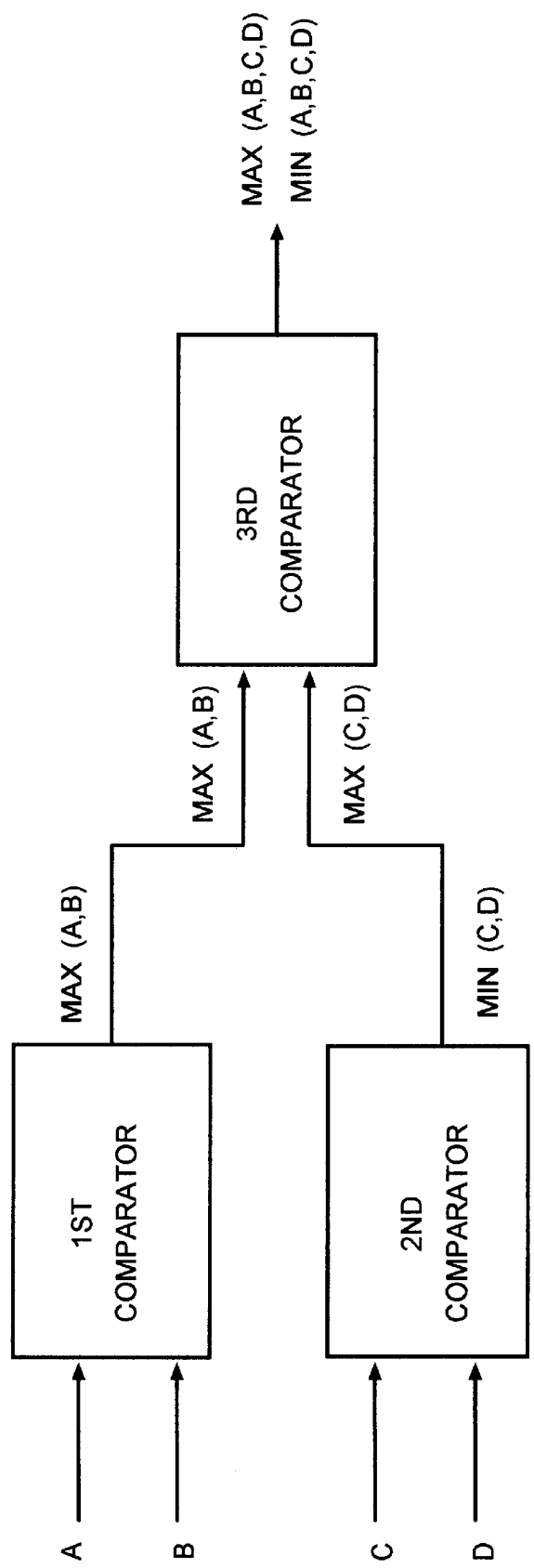
FIG. 1 is a block diagram of a conventional maximum value/minimum value extractor.
Figure 2:
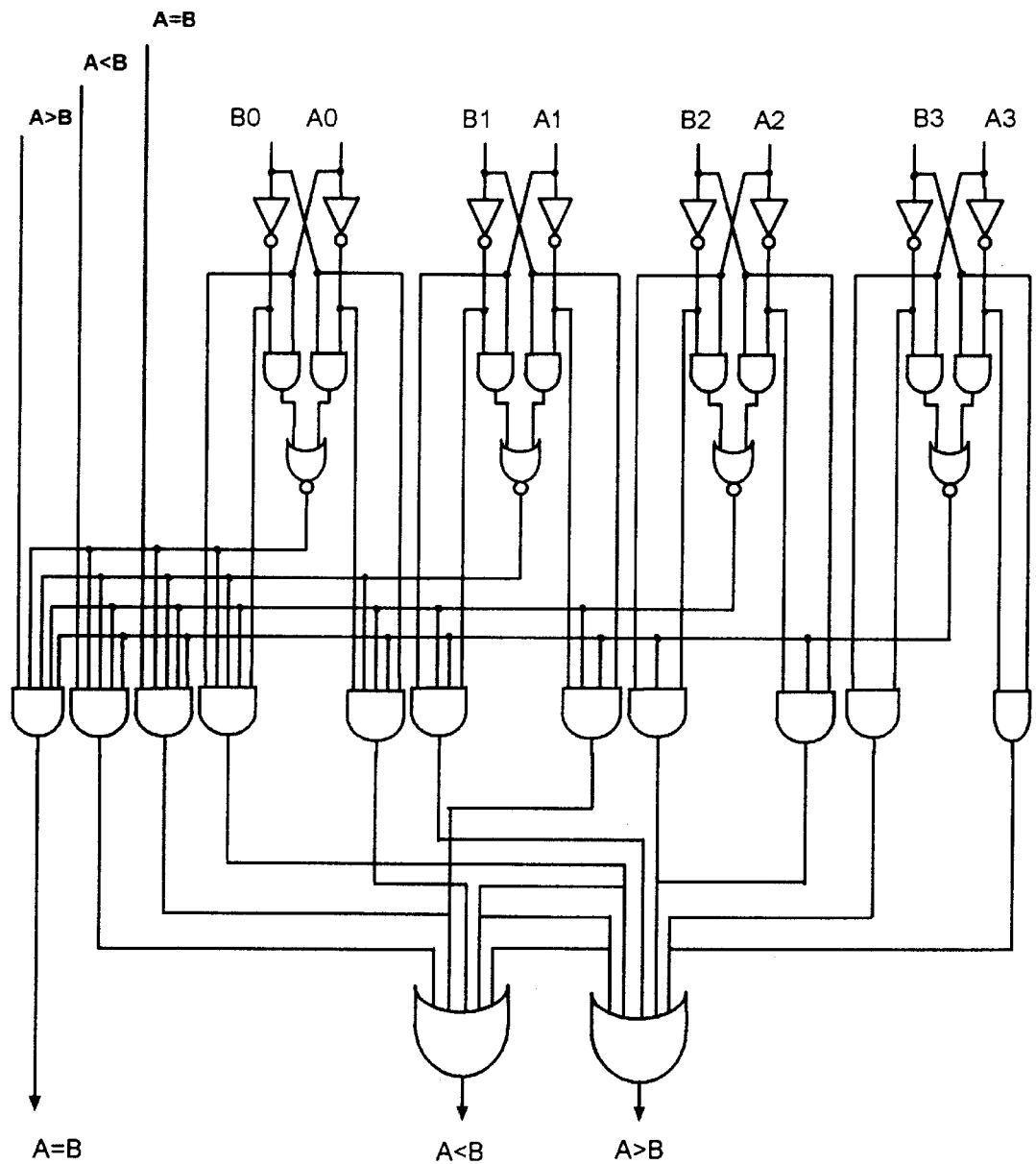
FIG. 2 is a circuit diagram of a comparator of FIG. 1.

Reference will now be made in detail to the preferred embodiments of the present invention, examples of which are illustrated in the accompanying drawings.

A basic principle of the comparing operation according to the present invention is as follows. First, there is provided the same number of memories as amount of the comparing data: a first memory which stores a first output; and a second memory which stores a second output in the same state as the first output, but one clock cycle later. The first and second outputs are set to "1" at initialization. The comparing data are arranged in a serial bit string, and every bit is input one by one, matching up with a clock pulse, so that the first output of the data bit string of which bit value is "1", is still "1", and the first output of the data bit of which bit value is "0" is still "0". Then, if the first outputs are all "0", only the first output of the data string in which the second output is stored as "1", is reset to "1", is repeatedly performed whenever the bits of respective data bit string are input. Therefore, the data bit string of which second output is "1" becomes the data having the maximum value at the next clock where the last bit of the data bit string is input and processed. The maximum value is consequently the OR-ed value with all first outputs before the reset operation.

To determine the minimum value, each bit of the input data string is inverted to obtain a maximum value, and then the maximum value is re-inverted. The data string having the maximum value is the data string having the minimum value. The address of the data string having the maximum or minimum values is also decoded to be output.

The circuit of the present invention includes: a multiplexer of which one input port is connected to a data line and the other input port is connected to the data line through an inverter, which outputs the data and inverted data of the data line-by a maximum/minimum value selecting signal; a plurality of maximum value extracting parts for receiving the output of the multiplexer, a clock signal and a reset signal, and outputting a first output which is at the same signal state as the initially input data bits, and maintains "0" regardless of the next data bit value, once the input data bit becomes "0" until any reset signal is applied, and a second output which follows the first output value by being delayed for two clock cycle; a maximum value/minimum value signal generator having input terminals respectively connected to the first outputs of the plurality of maximum value extracting parts by the maximum/minimum value selecting signal, and outputting a value which is NORed with all inputs, as the minimum value, or a value which is inverted value of the NORed value, as the maximum value; and a plurality of reset signal generators having one input terminal to which the second outputs of the plurality maximum value extracting parts are respectively connected, and the other input terminal to which the minimum signal of the maximum/minimum value signal generator is connected, thereby generating a reset signal for resetting the first output of the maximum extracting part at the initial value if the two input signals are at the same state. Therefore, the data string of which the second output of the maximum value extracting part is "1" among the plurality of data bit strings, is the data string having the maximum/minimum values, and the value output through the maximum/minimum value signal generator is the maximum value or the minimum value. In addition, the circuit of the invention further includes an address encoder for receiving the second output of each maximum value extracting part, encoding it and outputting its address.

With reference to the attached drawing, an embodiment of the present invention, namely, a circuit for comparing eight data strings each having 8 bits will be described below.

Figure 3:
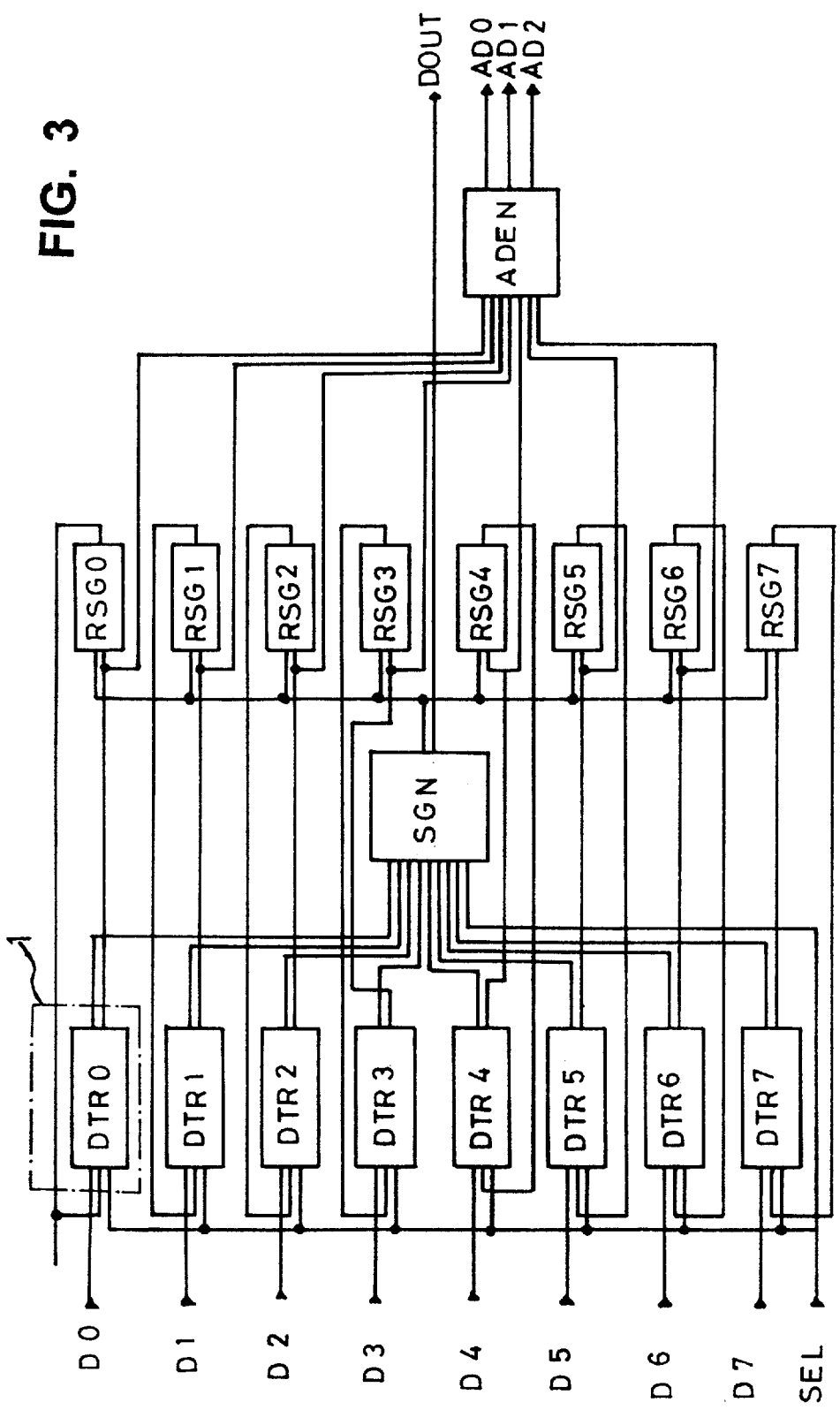
FIG. 3 is a block diagram of a maximum value/minimum value extractor in the embodiment of the present invention.

As illustrated in FIG. 3, eight data inputs D0, D1, D2 through D7 are respectively input to DTR0, DTR1, DTR2 through DT7, each being a maximum value extracting part 1. The first outputs of the maximum value extracting parts are respectively connected to the input terminals of a maximum/minimum signal generator SGN. The second outputs of the maximum value extracting parts are respectively connected to the input terminals of the reset signal generators RSG0, RSG1, RSG2 through RSG7. Simultaneously, all the second outputs excluding the 8th second output (from DTR7) are respectively connected to the input terminals of the address encoder ADEN.

Operation of the thus-connected circuit is as follows.

Detecting the maximum value or the minimum value is performed so that the corresponding selection signal is input to thereby initialize the system, namely, to set the first and second outputs to "1". Once the initial bit of the eight data inputs are input, that is, the maximum bit MSB among those eight data inputs is input one by one, matching up with the clock signal, the first output of data string having the data bit whose bit value is "1", maintains "1", and the first output of the data string whose bit value is "0", maintains the value "0".

The maximum/minimum value signal generator SGN outputs the value NORed with all the first outputs of the maximum value extracting parts as the minimum value, or the inverted value of the NORed value as the maximum value, matching up with each clock timing signal, for example, at every rising edge, to Dout.

Each reset signal generator RSG0-7 generates the reset signal which receives the signal of the maximum/minimum value signal generator when the first outputs all become "0" and the second output, and then resets only the first output of the data string of which the second output is stored "1". The reset signal resets the first output of the corresponding maximum value extracting part for "1". This operation is continuously repeated for each following bit.

After the eight input bits are all input and a clock cycle lapses, the data string of which second output of the maximum extracting part is "1" becomes the data having the maximum or minimum value. The address encoder receives seven second outputs, and encodes them to thereby generate the address signals AD0, AD1 and AD2. All the eight second outputs may be encoded, but it is enough to use only seven second outputs to encode all the eight outputs, so that one second-output is omitted (the output of DTR7). Therefore, if the selector signal is determined to be the maximum value, the maximum value is output to the Dout terminal. If the selector signal is determined to be the minimum value, the minimum value is output to the Dout terminal. The data address having the maximum or minimum value is output to the outputs AD0, AD1, AD2 of ADEN.

Figure 4:
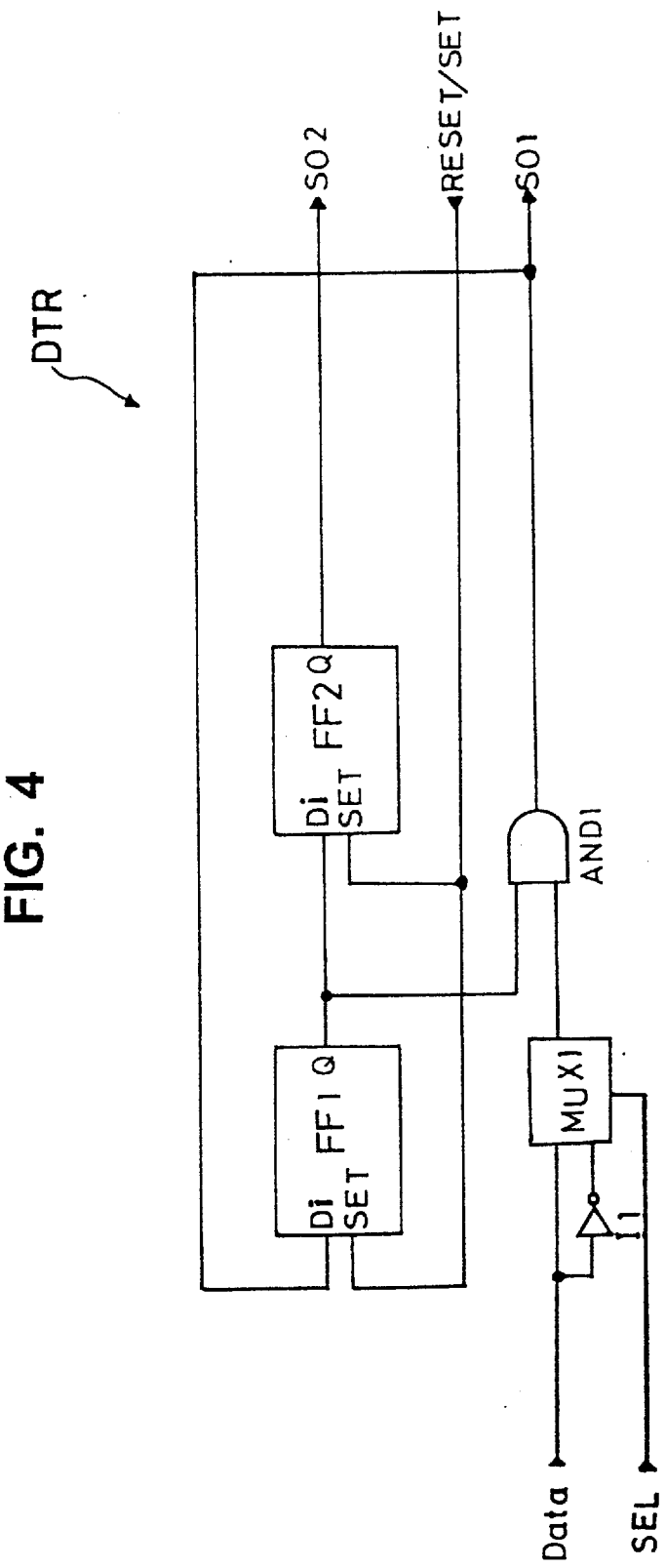
FIG. 4 is a circuit diagram of a bit comparator.

As illustrated in FIG. 4 (which illustrates a maximum value extracting part 1), its output is set to "1" by the reset signal RESET connected to the SET input terminal, and a first flipflop FF1 and a second flipflop FF2 of which input signal which is input to an input terminal Di by a clock signal (not shown), are output through their respective output terminal Q, and connected in series with each other. That is, the output Q of the first flipflop FF1 is connected to the input terminal Di of the second flipflop FF2, and the output of Q of the second flipflop FF2 becomes the second output SO2.

The multiplexer MUX1, to which the selection signal SEL for selecting the minimum value or maximum value is applied, has two input terminals: to one input terminal, Data is input; and to the other input terminal, inverted Data is input. That is, Data is connected through an inverter I1 to the other input terminal. The output Q of the first flipflop FF1 and the output terminal of the multiplexer MUX1 are respectively connected to the two input terminals of an AND gate AND1, and the output of the AND gate is connected to the input terminal Di of the first flipflop FF1, and simultaneously output as the first output SO1.

The thus structured maximum value extracting part 1 operates as follows.

Once the reset signal RESET is applied, FF1 and FF2 are set, so that the output Q becomes "1". If the data signal Data is "1", the two inputs of the AND gate are both all "1" and the first output of the AND gate is also "1". If the data is "1", the first output is "0". As the first output is applied to the input Di of the first flipflop FF1, the output Q of the first flipflop FF1 becomes "0" by the next clock signal. Once the FF1 is set for "0", the first output is maintained at "0" regardless of the following data bit. Therefore, after the reset signal RESET is applied and the data "1" is input, the first output is continuously maintained at the value "1", and if the data "0" is input, the first output is continuously the value "0". And also, if the data "1" is input after the reset signal is applied, the second output is maintained at "1", and if the data "0" is input, the second output is converted into "0" at the time point when the one after the next clock is applied.

Figure 5:
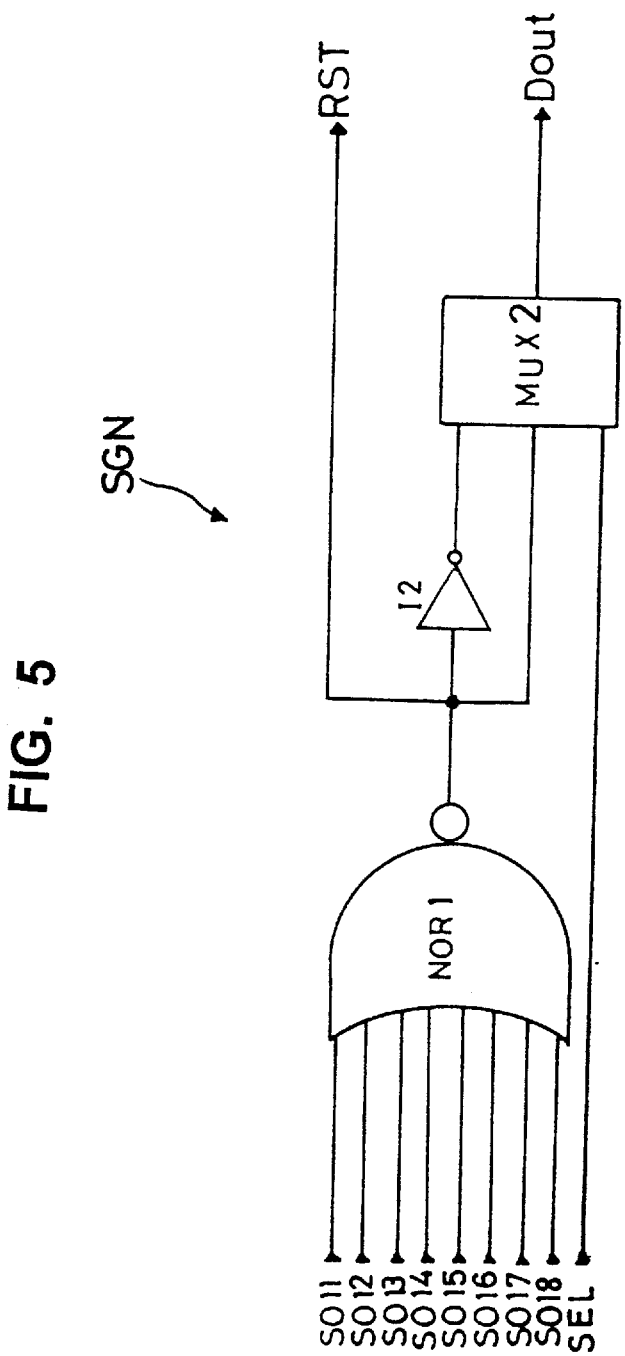
FIG. 5 is a circuit diagram of a word comparator.

The maximum value/minimum value signal generator SGN is realized with the circuit illustrated in FIG. 5.

This circuit includes a NOR gate NOR1 which receives the first outputs SO11, SO12, SO13 through SO18 of the maximum value extracting parts and performs a NOR operation, an inverter I2 for inverting the output of the NOR gate, and a multiplexer MUX2 which receives the output of the NOR gate NOR1 and the output of the inverter I2 and selects the output of the NOR gate or the output of the inverter I2 by the selection signal for selecting the maximum or minimum value to thereby output the selected signal.

Operation of this maximum/minimum value signal generator SGN is as follows.

The first outputs SO11 through SO18 are NORed and output through the MUX. The output of this MUX becomes the maximum value/minimum value signal Dout. The output of the NOR gate is directly output and becomes the reset standby signal RST connected to the input of the reset signal generators RSG0-7. When the selection signal SEL selects the maximum value, MUX2 connects the value passing through the inverter I2 to the maximum value signal, and connects the output of NOR2 to the minimum value signal Dout in case the selection signal selects the minimum value.

Figure 6:
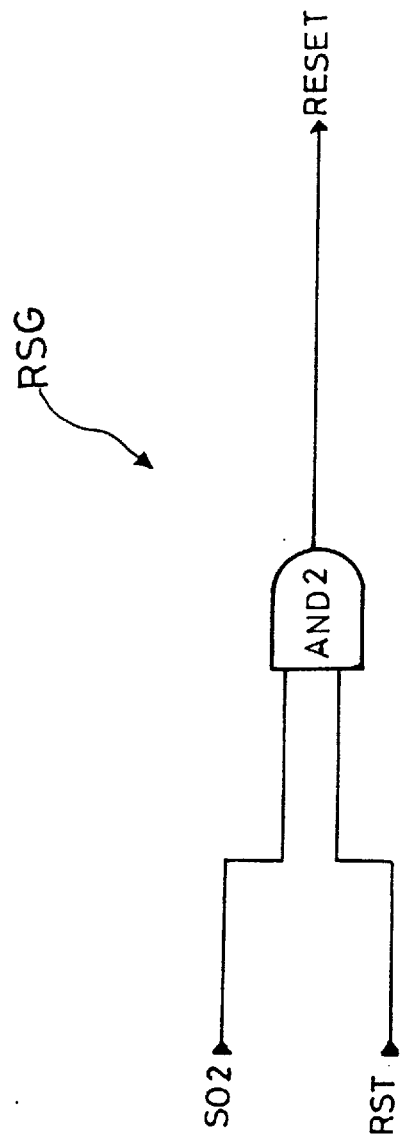
FIG. 6 is a circuit diagram of a reset signal generator.

As illustrated in FIG. 6, a reset signal generator, RSG0, for example, includes an AND gate AND2 which receives the second output SO2 of the maximum value extracting part of one input and also receives the reset standby signal RST of the maximum/minimum value signal generator SGN of the other input. Here, instead of the AND gate, a NAND gate and the inverter can be serially connected. In this reset signal generator RSG0, if the second output of the maximum value extracting part is "1", at the high state and the reset standby signal RST of the maximum/minimum value signal generator SGN is "1", the output of AND2 is "1". When either the second output of the maximum value extracting part or the RST of the maximum/minimum value signal generator SGN is "0", the output of AND2 becomes "0" of the low state. The output of the AND gate is the reset signal RESET and connected to the set inputs of the first and second flipflops FF1 and FF2 of the maximum value extracting part to thereby reset the flipflops FF1 and FF2.

Figure 7:
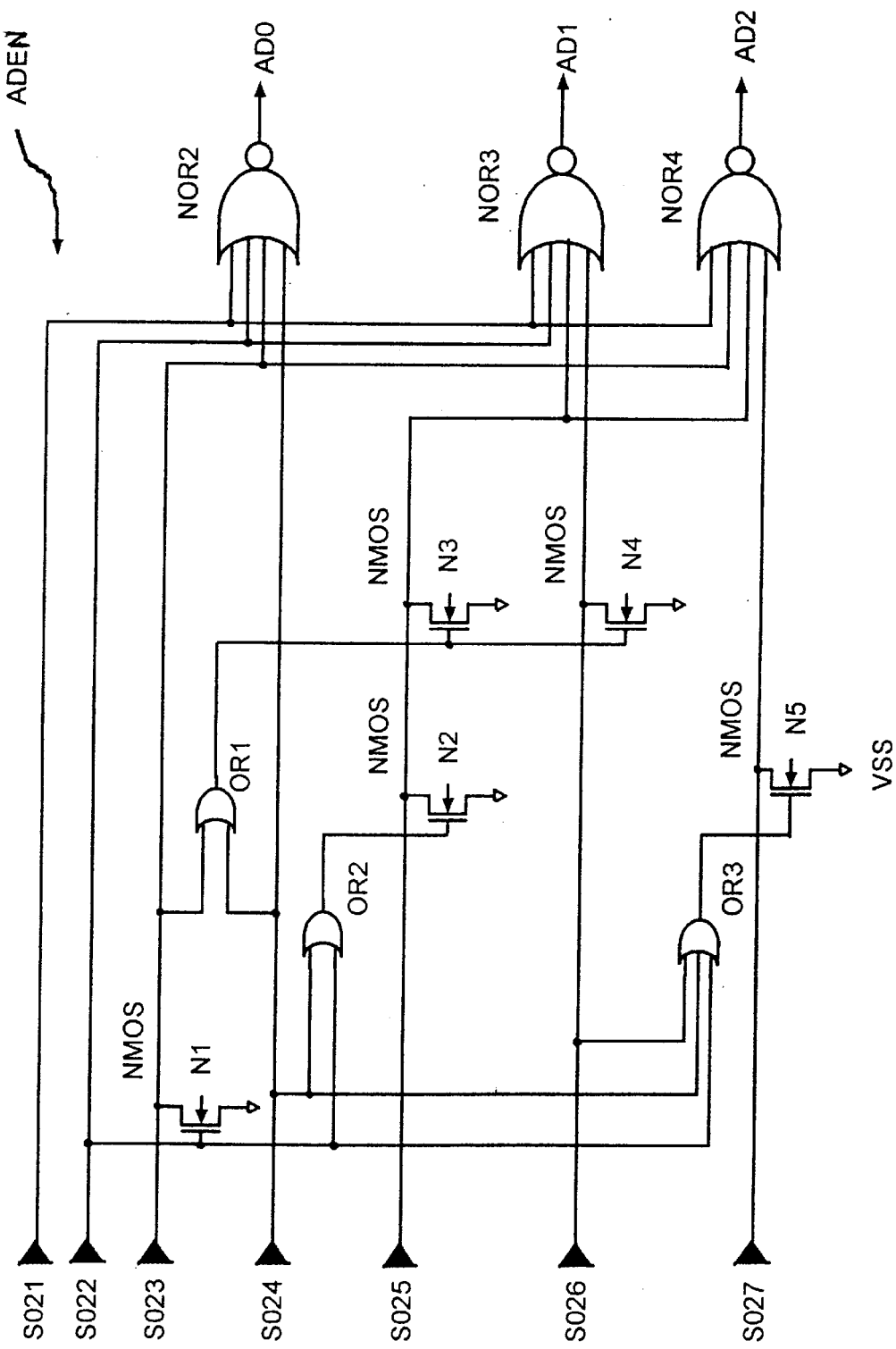
FIG. 7 is a circuit diagram of an address extractor.

As illustrated in FIG. 7, the address encoder ADEN outputs the data address having a minimum address from more than two addresses having the maximum value.

Seven second outputs SO21 through S27 among eight second outputs SO2 output from the maximum value extracting parts connected to each data string are input to address encoder ADEN. If the encoding result of the seven SO2 is "000", it means the address of the data string to which no data is input, and this data has the maximum value or minimum value. The encoder ADEN includes three NOR gates, three OR gates, and five NMOS transistors. The first OR gate OR1 of which two input terminals are respectively connected to the 3rd second output SO23 and the 4th second output lines, performs an OR logic operation with those two signals. The second OR gate OR2 of which two input terminals are respectively to the 2nd second output SO22 and the 4th second output SO24, performs an OR logic operation. The third OR gate OR3 of which three input terminals are respectively connected to the 2nd second output SO22, the 4th second output SO24 and the 6th second output SO26, performs the OR logic operation. The first NMOS transistor N1 has a gate connected to the 2nd second output line SO22, and a drain connected to the 3rd second output line SO23, so that if a high voltage is applied to the 2nd second output line SO22, the 3rd second output line SO23 is connected to the ground potential Vss. The second NMOS transistor N2 has a gate connected to output terminal of the second OR gate OR2, and a drain connected to the 5th second output line SO25, so that if a high voltage is applied to the 2nd second output line SO22 and the 4th second output line SO24, the 5th second output line SO25 is connected to the ground potential Vss. The third NMOS transistor N3 has a gate connected to the output of the first OR gate OR1, and a drain connected to the 5th second output line SO25, so that if a high voltage is applied to the 2nd second output line SO22 and the 4th second output line SO24, the 5th second output line SO25 is connected to the ground potential Vss. The fourth NMOS transistor N4 has a gate connected to the output terminal of the first OR gate OR1, and a drain connected to the 6th second output line SO26, so that if a high voltage is applied to the 3rd second output line SO23 and the 4th second output line SO24, the 6th second output line SO26 is connected to the ground potential Vss. The fifth NMOS transistor N5 has a gate connected to the output of the third OR gate OR3, and a drain connected to the 7th second output line SO27, so that if a high voltage is applied to the 2nd second output line SO22, the 4th second output line SO24, and the 6th second output line SO26, the 7th second output line SO27 is connected to the ground potential Vss. The second NOR gate NOR2 has four input terminals respectively connected to 1st second output line SO21, the 2nd second output line SO22, the 3rd second output line SO23 and the 4th second output line SO24, and performs a NOR logic operation with those four input signals and outputs the result. The first NOR gate NOR3 has four input terminals respectively connected to the 1st second output line SO21, the 3rd second output line SO23, the 5th second output line SO25 and the 7th second output line SO27, and performs a NOR logic operation with those four input signals and outputs the result.

Operation of the thus-structured address encoder iscussed below in conjunction with Table 1.

TABLE 1

| OUTPUT ADDRESS | 1 | 2 | 3 | 4 | 5 | 6 | 7 | 8 |
|---|---|---|---|---|---|---|---|---|
| 000 | 1 | X | X | X | X | X | X | X |
| 001 | 0 | 1 | X | X | X | X | X | X |
| 010 | 0 | 0 | 1 | X | X | X | X | X |
| 011 | 0 | 0 | 0 | 1 | X | X | X | X |
| 100 | 0 | 0 | 0 | 0 | 1 | X | X | X |
| 101 | 0 | 0 | 0 | 0 | 0 | 1 | X | X |
| 110 | 0 | 0 | 0 | 0 | 0 | 0 | 1 | X |
| 111 | 0 | 0 | 0 | 0 | 0 | 0 | 0 | 1 |

In this Table, the output address is displayed in the far left column, and second output values of the maximum value extracting parts are displayed in the right column. That is, from 1st second output SO21 to the 8th second output SO28 are displayed. By examining the second output value of the second flipflop FF2 of the maximum value extracting part 1 after the lowest bit of each data is output, the address of the data of which value is "1" is extracted. Yet, if the maximum value or the minimum value is above two, it may cause a problem. That is, if the 3rd and 2nd data are the same values and this value is the maximum value or the minimum value, there may be a collision between those two maximum/minimum value addresses. To prevent this problem, the smallest address is output. That is, the 2nd address is output as the maximum value or minimum value address.

The address generator ADEN operates as illustrated in Table 3. When the 1st second output is "1", all the outputs AD0, AD1, AD2 of the second through fourth NOR gates are all "0", so that the address is "000". At this time, the address is not affected by the 2nd through the 8th second output states. When 2nd second output is "1", the outputs AD0 and AD1 of the second and third NOR gates are both "0". And if the output AD2 of the third NOR gate is "1", the address is "001". At this time, the address is not affected by the 3rd through 8th second output states excluding the 1st and 2nd second outputs.

With respect to the other second outputs, the circuit operates in the same manner as above. When the 7th second output is "1", the outputs AD0 and AD1 of the second and third NOR gates are "1". If the output AD2 of the third NOR gate is "0", the address is "110". At this time, all the second outputs excluding the 8th second output have meaning. Finally, when the 8th second output is "1" and all the other second outputs are "0", the outputs AD0 and AD1 of the second through fourth NOR gates are all "1", so that the address is "111".

The operation of the entire invention will be described with reference to Tables 2 and 3.

Tables 2 and 3 display the operation for determining out the maximum value/minimum value by inputting from the data bit having the maximum value. Eight 8-bit data inputs are set forth in the left column of Tables 2 and 3, and the first and second output states are written from the 1st through 8th steps of the first and second outputs before the data bit is input. Here, the number "01" means that the first output is "0" and the second output is "1". Eight comparators DTR0-7, one maximum value/minimum value signal generator SGN, eight reset signal generators RSG0-7, and one address encoder ADEN are needed to compare these eight data inputs, each having eight bits.

The procedure for determining the maximum value illustrated in Table 2 is as follows.

TABLE 2

| 8 BIT DATA | 0 | 1 | 2 | 3 | 4 | 5 |  | 6 | 7 | 7' | 8 | 8' | REMARK |
|---|---|---|---|---|---|---|---|---|---|---|---|---|---|
| 1 | 11001110 | 11 | 11 | 11 | 01 | 00 | 00 | 11001110 | 00 | 00 | 00 | 00 | 00 |
| 2 | 00100001 | 11 | 01 | 00 | 00 | 00 | 00 | 00100001 | 00 | 00 | 00 | 00 | 00 |
| 3 | 00110001 | 11 | 01 | 00 | 00 | 00 | 00 | 00110001 | 00 | 00 | 00 | 00 | 00 |
| 4 | 01001100 | 11 | 01 | 00 | 00 | 00 | 00 | 01001100 | 00 | 00 | 00 | 00 | 0c |
| 5 | 10101010 | 11 | 11 | 01 | 00 | 00 | 00 | 10101010 | 00 | 00 | 00 | 00 | 00 |
| 6 | 00010001 | 11 | 01 | 00 | 00 | 00 | 00 | 00010001 | 00 | 00 | 00 | 00 | 00 |
| 7 | 11110011 | 11 | 11 | 11 | 11 | 11 | 01 | 11110011 | 11 | 01 | 11 | 11 | 11 MAX |
| 8 | 00010000 | 11 | 01 | 00 | 00 | 01 | 00 | 00010000 | 00 | 00 | 00 | 00 | 00 VALUE |

The selection signal SEL is applied to select the maximum value, so that the non-inverted data is output to AND1 of the maximum value extracting part 1 and the output Dout of the maximum/minimum signal generator SGN is output at the non-inverted state to the AND gate AND1 of the maximum value extracting part 1. If the reset signal RESET is applied to initialize the circuit, the first and second outputs of the maximum value extracting parts are all set to "11". At this state, when the first bit of the data is input, the output of the AND gate AND1 of the maximum value extracting parts connected to the data string of which first bit value is "1", becomes "1". And the output of AND1 of the maximum value extracting part 1 connected to the data string of which first bit value is "0", becomes "0", so that the output is output to the data input terminal of the first flipflop FF1 and becomes the first output at the rising edge of the next clock. Therefore, the first outputs of the maximum value extracting parts processing the 1st, 5th and 7th data bits, become "1", and all other outputs are "0". These states are displayed in the column (1). That is, the first and second outputs of the maximum value extracting parts processing the 1st, 5th and 7th data inputs are "11" and all other outputs are "01".

output, the address encoder is operated and displays that the address having the maximum value is "110" using Table 1.

Next, the operation of determining the minimum of Table 3 will be described.

TABLE 3

| 8 BIT DATA | | 0 | 1 | 2 | 3 | 4 | 5 | | 6 | 7 | 7' | 8 | 8' | REMARK |
|---|---|---|---|---|---|---|---|---|---|---|---|---|---|---|
| 1 | 11001110 | 11 | 01 | 00 | 00 | 00 | 00 | 11001110 | 00 | 00 | 00 | 00 | 00 | |
| 2 | 00100001 | 11 | 11 | 11 | 01 | 00 | 00 | 00100001 | 00 | 00 | 00 | 00 | 00 | |
| 3 | 00110001 | 11 | 11 | 11 | 01 | 00 | 00 | 00110001 | 00 | 00 | 00 | 00 | 00 | |
| 4 | 01001100 | 11 | 11 | 01 | 00 | 00 | 00 | 01001100 | 00 | 00 | 00 | 00 | 00 | |
| 5 | 00001010 | 11 | 11 | 11 | 11 | 11 | 01 | 00001010 | 00 | 00 | 00 | 00 | 00 | |
| 6 | 00010001 | 11 | 11 | 11 | 11 | 01 | 00 | 00010001 | 00 | 00 | 00 | 00 | 00 | |
| 7 | 00000011 | 11 | 11 | 11 | 11 | 11 | 11 | 00000011 | 11 | 01 | 11 | 01 | 11 | MINIMUM |
| 8 | 00010000 | 11 | 11 | 11 | 11 | 01 | 00 | 00010000 | 00 | 00 | 00 | 00 | 00 | VALUE |

Next, when the second bits of the data are input, the output of AND1 of the maximum value extracting part 1, in which the second bit value is "1" and the first output is maintained at "1", becomes "1". And the output of AND1 connected to the data string of which first output is "0", is not affected by the state of the data bit value, and is continuously "0", so that the outputs of AND1 are respectively input to the input terminal of the first flipflop FF1 and the first output is converted again at the rising edge of the next clock. Therefore, the first outputs of the maximum value extracting parts processing the 1st and 7th data bits become "1" and all the rest are "0". This is displayed at the column (2) of Table 2. That is, the first and second outputs of the maximum value extracting parts processing the 1st and 7th data inputs are "11", the 5th data input is "01", and all the rest are all "00". This operation is continuously repeated whenever the data bits are input. The state that the data bits are input until the fourth bits of the data string is displayed in the column (4).

When the fifth bits are input, the output of AND1 of which first output is "0", is maintained at "0" regardless of the input bit. As the bit value of the 7th data bit is "0", all the first outputs are "0" as illustrated in the column (5). As a result, the output of NOR1 in the maximum/minimum signal generator SGN of FIG. 5 is "1", and the reset standby signal RST is "1". When this RST signal is converted into "1", among the reset signal generators RSG0-7 of FIG. 6, only the reset signal generator of which second output is "1" converts the reset signal RESET into "1" and outputs it. Then, the reset signal resets the first and second flipflops of the maximum value extracting part 1 and sets the first and second outputs all at "1". Here, the reset signal is generated to reset only the maximum value extracting part of which second output is maintained at "1". As illustrated in the column (6'), only the 7th data input becomes "11" and the rest are continuously "00".

When the 6th data bit is input, its operation is the same. As illustrated in the columns (7 and 7'), only the 7th data line is "11", and the rest are continuously "00".

At last, when the seventh and eighth bits are input, only the 7th data line becomes "11", and the rest are "00" as illustrated in the columns (8 and 8'). After all, only the second output of the maximum value extracting part, to which the 7th data bit is connected, becomes "1" and all the rest of the second outputs are "0". Therefore, the 7th data bit becomes the maximum value, and this maximum value is the same as the output of the maximum/minimum value signal generator SGN. As illustrated above, after the last bit is The selection signal SEL is applied to select the maximum value, so that the inverted data is output to the AND1 of the maximum value extracting parts, and the output Dout of the maximum/minimum signal generator SGN is output at the inverted state to the AND gate AND1 of the maximum value extracting parts. If the reset signal RESET is applied to initialize the circuit, the first and second outputs of the maximum value extracting part 1 are all set to "11". At this state, when the first bit of the data is input, the output of the AND gate AND1 of the maximum value extracting parts connected to the data string of which first bit value is "1", becomes "0". And the output of AND1 of the maximum value extracting parts connected to the data string of which first bit value is "0", becomes "1", so that the output is applied to the data input terminal of the first flipflop FF1 and becomes the first output at the rising edge of the next clock. Therefore, the first output of the maximum value extracting part 1 processing the 1st data bit, becomes "0", and all other outputs are "1". These states are displayed in the column (1). That is, the first and second outputs of the maximum value extracting parts processing the 1st data bits are "01" and all other outputs are "11".

Next, when the second bits of the data are input, the output of AND1 of the maximum value extracting parts, in which the second bit value is "0" and the first output is maintained at "1", becomes "1". And the output of AND1 connected to the data string of which first output is "0", is not affected by the state of the data bit value and is continuously "0", so that the outputs of AND1 are respectively input to the input terminal of the first flipflop FF1 and the first output is converted again at the rising edge of the next clock. Therefore, the first outputs of the maximum value extracting parts processing the 1st and 4th data bits become "0" and the rest first outputs are all "1". This is displayed at the column (2) of Table 3. That is, the first output of the maximum value extracting parts processing the 1st and 4th data bits, is "0", and all the rest output "11". The 1st second output becomes "0" because the first output is "0", so that the first data line is "00". This operation is continuously repeated whenever the data bits are input. The state that the data bits are input until the sixth bits of the data string is displayed in column (6).

When the seventh bits are input, the output of AND1 of which first output is "0", becomes "0" regardless of the input bit. Since the bit value of the 7th data bit is "1", all the first outputs are "0" as illustrated in column (7). As a result, the output of NOR1 in the maximum/minimum signal generator SGN of FIG. 5 is "1", and the reset standby signal RST is "1". When this RST signal is converted into "1", among the reset signal generators RGS0-7 of FIG. 6, only the reset signal generator of which second output is "1", converts the reset signal RESET into "1" and outputs it. Then, the reset signal resets the first and second flipflops FF1 and FF2 of the maximum value extracting part to which the reset signal is connected, and sets the first and second outputs all at "1". As illustrated in the column (7'), only the 7th data line becomes "11" and the rest are continuously "00".

At last, when the 8th data bit is input, its operation is the same. As illustrated in the columns (8 and 8'), only the 7th data line is "11", and the rest are continuously "00".

Finally, only the second output of the maximum value extracting part, to which the 7th data bit is connected, becomes "1" and all the rest are "0". Therefore, the 7th data input becomes the minimum value, and this minimum value is the same as the output of the maximum/minimum value signal generator SGN. As illustrated above, after the last bit is output, the address encoder ADEN is operated and displays that the address having the maximum value is "110" using Table 1.

The maximum value/minimum value extracting device of the invention receives data in the form of data stream, compares a plurality of data simultaneously to thereby find the minimum value or maximum value as well as its address. As the invention processes the plurality of data simultaneously, its processing speed is high, and the invention also can determine the minimum value in as many clock cycles as data bits. In addition, the circuit is simple to design and reduces chip size. Regardless of the amount of input data, the invention obtains the minimum value after the clock signal corresponding to the number of bits elapses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A maximum value extractor, comprising:
   a plurality of maximum value extracting parts, to which a clock signal, a reset signal and a data bit stream are input, said plurality of maximum value extracting parts outputting a first output having a value equal to that of a first bit input thereto and maintaining "0" single state regardless of subsequent data bit value once the input data bit becomes "0" until the reset signal is applied, and a second output which follows the first output value, delayed by two clock cycles of the clock signal;
   a maximum value signal generator, receiving the first output of said plurality of maximum value of extracting parts, said maximum value signal generator outputting an ORed value all inputs and outputting a result as a maximum value signal; and
   a plurality of reset signal generators receiving second outputs from said plurality of maximum value extracting parts, and a minimum signal from said maximum value signal generator, thereby resetting the first output of said plurality of maximum extracting parts to an initial value, if the two input signals are at the same state,
   wherein a data string in which the second output of said plurality of maximum value extracting parts is "1" is a data string having the maximum value among a plurality of data bit strings and a value output by said maximum value signal generator becomes the maximum value signal.

2. The extractor as claimed in claim 1, wherein each of said plurality of maximum value extracting parts includes:
   a first flipflop for resetting the output to "1" by the reset signal and setting an input as an output according to the clock signal;
   a second flipflop connected in series with said first flipflop, resetting the output to "1" by the reset signal and setting the input as the output according to the clock signal; and
   an AND gate for receiving the output of said first flipflop and an input data bit as two inputs, performing an AND operation with the two inputs to output the result as a first output, the first output being connected to an input terminal of said first flipflop.

3. The extractor as claimed in claim 1, wherein said maximum value signal generator includes an OR gate for receiving all the first outputs of said plurality of maximum value extracting parts to perform an OR logic operation and outputting the maximum value signal.

4. The extractor as claimed in claim 1, wherein each of said plurality of reset signal generators includes an AND gate for receiving the second output of said plurality of maximum value extracting parts as one input, inverting the maximum value signal of said maximum value signal generator and receiving the inverted signal as the other input.

5. A minimum value extractor, comprising:
   a plurality of maximum value extracting parts, to which a clock signal, a reset signal and a data bit stream are input, said plurality of maximum value extracting parts outputting a first output which becomes the same signal state as that of the initially input data bits, and maintains "0" regardless of subsequent data bit values once the input data bit becomes "0" until the reset signal is applied, and a second output which follows the first output value, delayed by two clock cycles of the clock signal;
   a maximum value signal generator, receiving the first outputs of said plurality of maximum value extracting parts, said maximum value signal generator performing an OR operation with all inputs and outputting a result as a maximum value signal;
   a plurality of reset signal generators receiving the second outputs from said plurality of maximum value extracting parts, and a minimum signal from said maximum value signal generator, thereby resetting the first output of said plurality of maximum extracting parts to the initial value, if the two input signals are at the same state;
   a data inverter whose output terminal is connected to a data bit input terminal of said plurality of maximum value extracting parts and receives the data bit; and
   an output inverter connected to an output terminal of said maximum value signal generator, wherein a data string in which a second output of said plurality of maximum value extracting parts is "1" is the data string having the minimum value among a plurality of data bit strings, and a value output through said output inverter is the minimum value.

6. The extractor as claimed in claim 5, wherein each of said plurality of maximum value extracting parts includes:
   a first flipflop for resetting the output to "1" by the reset signal and setting an input as an output according to the clock signal;
   a second flipflop connected in series with said first flipflop, resetting the output to "1" by the reset signal and setting the input as the output according to the clock signal; and an AND gate for receiving the output of said first flipflop and the input data bit as two inputs, performing an AND operation with the two inputs to output the result as a first output, the first output being connected to an input terminal of said first flipflop.

7. The extractor as claimed in claim 5, wherein said maximum value signal generator includes a NOR gate for receiving all the first outputs of said plurality of maximum value extracting parts to perform a NOR operation and outputting an output, without processing through said output inverter, as the maximum value signal.

8. The extractor as claimed in claim 5, wherein each of said plurality of reset signal generators includes an AND gate for receiving the second output of said plurality of maximum value extracting parts as one input, inverting the maximum value signal of said maximum value signal generator and receiving the inverted signal as the other input.

9. A minimum value/maximum value extractor, comprising:

a multiplexer of which one input port is connected to a data line and another input port is connected to the data line through an inverter, said multiplexer outputting the data and inverted data of the data line according to a maximum/minimum value selecting signal;

a plurality of maximum value extracting parts for receiving an output of said multiplexer, a clock signal and a reset signal, said plurality of maximum value extracting parts outputting a first output which becomes the same signal state as that of the initially input data bits, and maintains "0" regardless of subsequent data bit value once the input data bit becomes "0" until the reset signal is applied, and a second output which follows the first output value delayed by two clock cycles of the clock signal;

a maximum value/minimum value signal generator, receiving the first outputs of said plurality of maximum value extracting parts according to the maximum/minimum value selecting signal, and outputting a value which is a NORed value of all inputs as a minimum value or a value which is an inverted value of the NORed value as a maximum value; and a plurality of reset signal generators receiving the second outputs from said plurality of maximum value extracting parts, and the minimum value from said maximum/minimum value signal generator, thereby generating the reset signal for resetting the first output of said plurality of maximum extracting parts to an initial value if the two input signals are at the same state, wherein a data string in which the second output of said plurality of maximum value extracting parts is "1" is a data string having the maximum/minimum values among a plurality of data bit strings and a value output by said maximum/minimum value signal generator becomes the maximum value or the minimum value.

10. The extractor as claimed in claim 9, wherein each of said plurality of maximum value extracting parts includes:

a first flipflop for resetting the output to "1" by the reset signal and setting an input as an output according to the clock signal;

a second flipflop connected in series with said first flipflop, resetting the output to "1" by the reset signal and setting the input as the output according to the clock signal;

a multiplexer having one input connected to the data line and the other input connected to the data line through the inverter, thereby outputting the data of the data line and the inverted data according to the maximum/minimum value selection signal; and an AND gate for receiving the output of said first flipflop and the input data bit as two inputs, performing an AND operation with the two inputs to output the ANDed signal as a first output, the first output being connected to an input terminal of said first flipflop.

11. The extractor as claimed in claim 9, wherein said maximum value signal generator includes:

a NOR gate for receiving all the first outputs of said plurality of maximum value extracting parts and performing a NOR operation; and a multiplexer having one input terminal connected to an output terminal of said NOR gate and the other input terminal connected to the output terminal of the NOR gate through the inverter, thereby outputting the output of the NOR gate or the inverted NOR gate output according to the maximum value/minimum value selection signal.

12. The extractor as claimed in claim 9, wherein each of said plurality reset signal generators includes an AND gate having an input terminal for receiving the second output of said plurality of maximum value extracting parts and the other input terminal for receiving the minimum value signal of said minimum/maximum value signal generator.

13. A method of extracting a maximum value from a plurality of data bit strings, comprising the steps of:

(a) outputting a first output having a value equal to that of a first bit input thereto and maintaining a "0" signal state regardless of subsequent data bit values once the input data bit becomes "0" until a reset signal is applied, and outputting a second output which follows the first output value, delayed by two clock cycles of a clock signal (b) receiving the first output of said step (a) and outputting an ORed value of all inputs and outputting a result as a maximum value signal; and (c) receiving second outputs from said step (a) and a minimum signal from said step (b) thereby resetting the first output of said step (a) to an initial value, if the two input signals are at the same state, wherein a data string in which the second output of said step (a) is "1" is a data string having the maximum value among the plurality of data bit strings and a value output by said step (b) becomes the maximum value signal.

14. The method as claimed in claim 13, wherein said step (a) includes the sub-steps of:

(a)(1) resetting the output of a first flipflop to "1" by the reset signal and setting an input as an output according to the clock signal;

(a)(2) resetting the output of a second flipflop to "1" by the reset signal and setting the input as the output according to the clock signal; and (a)(3) receiving the output of the first flipflop and an input data bit as two inputs, performing an AND operation with the two inputs to output the result as a first output, the first output being connected to an input terminal of the first flipflop.

15. The method as claimed in claim 13, wherein said step (b) includes the sub-step of receiving all the first outputs of said step (a) and performing an OR logic operation and outputting the maximum value signal.

16. The method as claimed in claim 13, wherein said step (c) includes the sub-step of receiving the second output of said step (a) as one input, inverting the maximum value signal of said step (b) and receiving the inverted signal as the other input.

17. A method of extracting a minimum value from a plurality of data bit strings, comprising the steps of:
- (a) outputting a first output which becomes the same signal state as that of initially input data bits, and maintains "0" regardless of subsequent data bit values once the input data bit becomes "0" until a reset signal is applied, and a second output which follows the first output value, delayed by two clock cycles of a clock signal
- (b) receiving the first outputs of said step (a) and performing an OR operation with all inputs and outputting a result as a maximum value signal; and
- (c) receiving the second outputs from said step (a) and a minimum signal from said step (b) thereby resetting the first output of said step (a) to the initial value, if the two input signals are at the same state;

wherein a data string in which a second output of said step (b) is "1" is the data string having the minimum value among the plurality of data bit strings, and a value output through an inverter is the minimum value.

18. The method as claimed in claim 17, wherein said step (a) includes the sub-steps of:
- (a)(1) resetting the output of a first flipflop to "1" by the reset signal and setting an input as an output according to the clock signal;
- (a)(2) resetting the output of a second flipflop to "1" by the reset signal and setting the input as the output according to the clock signal; and
- (a)(3) receiving the output of the first flipflop and the input data bit as two inputs, performing an AND operation with the two inputs to output the result as a first output, the first output being connected to an input terminal of the first flipflop.

19. The method as claimed in claim 17, wherein said step (b) includes the sub-step of receiving all the first outputs of said step (a) and performing a NOR operation and outputting an output, without processing through an inverter, as the maximum value signal.

20. The extractor as claimed in claim 17, wherein said step (c) includes the sub-step of receiving the second output of said step (a) as one input, inverting the maximum value signal of said step (b) and receiving the inverted signal as the other input.

21. A method of extracting a minimum value or a maximum value from a plurality of data bit strings, comprising the steps of:
- (a) outputting data and inverted data of a data line according to a maximum/minimum value selecting signal;
- (b) receiving an output of said step (a), a clock signal, and a reset signal, and outputting a first output which becomes the same signal state as that of the initially input data bits, and maintains "0" regardless of subsequent data bit value once the input data bit becomes "0" until the reset signal is applied, and a second output which follows the first output value delayed by two clock cycles of the clock signal;
- (c) receiving the first outputs of said step (b) according to the maximum/minimum value selecting signal, and outputting a value which is a NORed value of all inputs as a minimum value or a value which is an inverted value of the NORed value as a maximum value; and
- (d) receiving the second outputs from said step (b) and the minimum value from said step (c) thereby generating the reset signal for resetting the first output of said step (b) to an initial value if the two input signals are at the same state, wherein a data string in which the second output of said step (b) is "1" is a data string having the maximum/minimum values among the plurality of data bit strings and a value output by said step (c) becomes the maximum value or the minimum value.

22. The method as claimed in claim 21, wherein said step (b) includes the sub-steps of:
- (b)(1) resetting the output of a first flipflop to "1" by the reset signal and setting an input as an output according to the clock signal;
- (b)(2) resetting the output of a second flipflop to "1" by the reset signal and setting the input as the output according to the clock signal;
- (b)(3) to outputting the data of the data line and inverted data of the data line according to the maximum/minimum value selection signal; and
- (b)(4) receiving the output of the first flipflop and the input data bit as two inputs, performing an AND operation with the two inputs to output the ANDed signal as a first output, the first output being connected to an input terminal of the first flipflop.

23. The method as claimed in claim 21, wherein said step (c) includes the sub-step of:
- (c)(1) receiving all the first outputs of said step (b) and performing a NOR operation; and
- (c)(2) outputting an output of said step (c)(1) or an inverted output of said step (c)(1) according to the maximum value/minimum value selection signal.

24. The method as claimed in claim 21, wherein said step (d) includes the sub-step of receiving the second output of said step (b) and the other input terminal for receiving the minimum value signal of said step (c).

* * * * *